US007267292B2

(12) United States Patent
Dobbs et al.

(10) Patent No.: US 7,267,292 B2
(45) Date of Patent: Sep. 11, 2007

(54) METHOD FOR PRODUCING FINE ALUMINA PARTICLES USING MULTI-CARBIDE GRINDING MEDIA

(75) Inventors: Robert Dobbs, Newfield, NY (US); Leonard E. Dolhert, Ithaca, NY (US)

(73) Assignee: Primet Precision Materials, Inc., Ithaca, NY (US)

( * ) Notice: Subject to any disclaimer, the term of this patent is extended or adjusted under 35 U.S.C. 154(b) by 85 days.

(21) Appl. No.: 11/035,490

(22) Filed: Jan. 14, 2005

(65) Prior Publication Data

US 2005/0158233 A1 Jul. 21, 2005

Related U.S. Application Data

(63) Continuation of application No. 10/797,343, filed on Mar. 10, 2004, now Pat. No. 7,140,567.

(60) Provisional application No. 60/453,427, filed on Mar. 11, 2003.

(51) Int. Cl.
*B02C 19/00* (2006.01)
(52) U.S. Cl. ........................... 241/21; 241/30; 241/184
(58) Field of Classification Search ................... 241/21, 241/30, 184
See application file for complete search history.

(56) References Cited

U.S. PATENT DOCUMENTS

| | | |
|---|---|---|
| 2,113,353 A | 4/1938 | McKenna |
| 2,581,414 A | 1/1952 | Hochberg |
| 3,690,962 A | 9/1972 | Rudy |
| 3,737,289 A * | 6/1973 | Rudy ........................... 75/242 |
| 3,779,745 A | 12/1973 | Rudy |
| 3,840,367 A * | 10/1974 | Rudy ........................... 51/293 |
| 4,066,451 A | 1/1978 | Rudy |
| 4,275,026 A | 6/1981 | Hazel et al. |
| 5,033,682 A | 7/1991 | Braun |
| 5,034,069 A | 7/1991 | Farge et al. |
| 5,215,945 A | 6/1993 | Dubensky et al. |
| 5,246,056 A | 9/1993 | Lomax et al. |
| 5,261,477 A | 11/1993 | Brunet et al. |

(Continued)

FOREIGN PATENT DOCUMENTS

JP 4293557 10/1992

(Continued)

OTHER PUBLICATIONS

Eremenko, V.N., et al., "Investigations of alloys or the ternary systems of W-HfC-C and W-ZrC-C at subsolidus temperatures", Dokl.Akad. Nauk. Ukr. SSSR, Ser. A No. 1, 89-88 (1976).

(Continued)

*Primary Examiner*—Mark Rosenbaum
(74) *Attorney, Agent, or Firm*—Wolf, Greenfield & Sacks, P.C.

(57) ABSTRACT

Grinding media, including shaped media such as spheres or rods ranging in size from about 0.5 micron to 100 mm in diameter, are formed from a multi-carbide material consisting essentially of two or more carbide-forming elements and carbon, with or without carbide-forming elements in their free elemental state. The media have extremely high mass density, extreme hardness, and extreme mechanical toughness.

14 Claims, 2 Drawing Sheets

U.S. PATENT DOCUMENTS

| | | | |
|---|---|---|---|
| 5,310,605 | A | 5/1994 | Baldoni, II et al. |
| 5,401,694 | A | 3/1995 | Gesing et al. |
| 5,407,464 | A | 4/1995 | Kaliski |
| 5,478,705 | A | 12/1995 | Czekai et al. |
| 5,500,289 | A | 3/1996 | Gavish |
| 5,518,187 | A | 5/1996 | Bruno et al. |
| 5,663,512 | A | 9/1997 | Schader et al. |
| 5,704,556 | A | 1/1998 | McLaughlin |
| 5,918,103 | A | 6/1999 | Kobayashi et al. |
| 5,993,506 | A | 11/1999 | Kobayashi et al. |
| 6,017,504 | A | 1/2000 | Kaliaguine et al. |
| 6,036,999 | A | 3/2000 | Zhao et al. |
| 6,152,982 | A | 11/2000 | Froes et al. |
| 6,231,636 | B1 | 5/2001 | Froes |
| 6,254,658 | B1 | 7/2001 | Taniuchi et al. |
| 6,387,152 | B1 | 5/2002 | Klassen et al. |
| 6,403,257 | B1 | 6/2002 | Christian et al. |
| 6,520,837 | B2 | 2/2003 | Weichert |
| 6,571,493 | B2 | 6/2003 | Amano et al. |
| 6,604,698 | B2 | 8/2003 | Verhoff et al. |
| 6,627,104 | B1 | 9/2003 | Wang et al. |
| 6,634,576 | B2 | 10/2003 | Verhoff et al. |
| 6,663,688 | B2 | 12/2003 | Findeisen et al. |
| 6,669,747 | B2 | 12/2003 | Salmon |
| 7,140,567 | B1 | 11/2006 | Dobbs |
| 2002/0047058 | A1 | 4/2002 | Verhoff et al. |
| 2005/0155455 | A1 | 7/2005 | Dobbs |
| 2005/0158227 | A1 | 7/2005 | Dobbs |
| 2005/0158228 | A1 | 7/2005 | Dobbs |
| 2005/0158229 | A1 | 7/2005 | Dobbs |
| 2005/0158230 | A1 | 7/2005 | Dobbs |
| 2005/0158231 | A1 | 7/2005 | Dobbs et al. |
| 2005/0158232 | A1 | 7/2005 | Dobbs |
| 2005/0158234 | A1 | 7/2005 | Dobbs |
| 2005/0159494 | A1 | 7/2005 | Dobbs |
| 2005/0161540 | A1 | 7/2005 | Dobbs |
| 2005/0200035 | A1 | 9/2005 | Dobbs |

FOREIGN PATENT DOCUMENTS

| | | |
|---|---|---|
| JP | 8276364 | 10/1996 |
| JP | 2001030175 | 2/2001 |
| JP | 200202264023 | 9/2002 |

OTHER PUBLICATIONS

Artyukn, L.V., et al., "Physicochemical reactions of tungsten carbide with hafnium carbide", Izv. Akad. Nauk SSSR, Neorg. Mater., No. 4, 634-637 (1976).

Velikanova, T.Ya., et al., "Effect of alloying on the structure and properties of cast WCI-x Materials", Poroshkovaya Metallurgiya, No. 2 (218), 53-58 (1981).

International Search Report dated May 12, 2006 for International Application Serial No. PCT/US05/007743, filed Mar. 9, 2005.

International Search Report and Written Opinion dated Jan. 31, 2006 for International Application Serial No. PCT/US05/007744, filed Mar. 9, 2005.

* cited by examiner

METHOD FOR PRODUCING FINE ALUMINA PARTICLES USING MULTI-CARBIDE GRINDING MEDIA

CROSS-REFERENCE TO RELATED APPLICATIONS

This application is a continuation of and claims priority from U.S. application Ser. No. 10/797,343 filed on Mar. 10, 2004 now U.S. Pat. No. 7,140,567 and entitled MULTI-CARBIDE MATERIAL MANUFACTURE AND USE, which in turn claims priority from U.S. Provisional Application Ser. No. 60/453,427 filed on Mar. 11, 2003 and entitled SPHERES IMPARTING HIGH WEAR RATES, incorporated herein by reference.

FIELD OF THE INVENTION

This invention relates generally to the field of grinding media composition, and more specifically to multi-carbide materials for use as grinding media formed in the shape of spheres or other shaped media.

BACKGROUND OF THE INVENTION

Carbide materials are well known in the art of material science. They include a range of compounds composed of carbon and one or more carbide-forming elements such as chromium, hafnium, molybdenum, niobium, rhenium, tantalum, thallium, titanium, tungsten, vanadium, zirconium, and others. Carbides are known for their extreme hardness with high temperature tolerance, properties rendering them well-suited for applications as cutting tools, drilling bits, and similar uses. Multi-element carbides are known for their improved toughness and hardness relative to single element carbides. Single element carbides are typically used with a metal binder to impart toughness.

Multi-carbides are formed by combining two or more carbide-forming elements with carbon. Some multi-carbides have other non-carbide forming elements in the composition, such as nitrogen, but are here referred to simply as multi-carbides since the dominant components are carbide-forming elements. For example, a combination of tungsten and titanium with carbon and nitrogen would be such a multi-carbide material. Some multi-carbide compositions are formed with a deficiency of carbon resulting in some small percentage of carbide-forming element not being converted to a carbide and instead remaining as uncombined elemental metal. These combinations can enhance certain of the favorable qualities of carbides, with some combinations increasing hardness, others increasing toughness, and so forth. Very small variations in composition can greatly affect the material's properties. Many of these variations are well understood by practitioners of the art and are amply published.

Spheres and solid bodies of other specific shapes, whether of carbide or multi-carbide, are difficult to manufacture due to the very properties that make them useful. Their high melting point necessitates a powerful energy source with difficulty in temperature regulation and effect, and their hardness makes them costly to machine.

For example, a primary manufacturing method used to manufacture carbides is to place the elements to be fused on the recessed surface of a large electrode. A very high current is passed from that electrode through the material and into another electrode in proximity, subjecting the material to the heat of an electric arc. This process is effective in fusing the materials, but causes inconsistent mixing of the elements in the compound and some uncontrolled loss of material due to vaporization, phenomena that can greatly compromise the properties of the resulting compound in uncontrolled and unpredictable ways. Hardness is also a challenge, as the manufacturing process results in an irregularly-shaped lump of resulting compound that is generally a few inches in diameter, colorfully known as a "cow chip". The "chip" is very hard, and is worked into smaller shapes only by percussive shocking or other crushing method that cleaves the chip into useful sizes. These processes leave small cracks in the finished product that greatly reduce both its hardness and its mechanical toughness. Re-melting of the material after crushing imposes high cost, and cannot efficiently achieve regular particle sizes or shapes. Consequently, although carbide is available in small spheres and other preferred shapes, those spheres are not optimally composed, they are irregularly sized, they are expensive, and they are lacking in effectiveness.

The known art currently does not have a process whereby multi-carbide materials can be formed into small and regular shapes without loss of optimized properties due to process variation in manufacture or degradation of material during shaping.

Reducing of particles, also known as comminution, is a very old art, practiced for example by the ancients to produce flour from grain by stone wheel grinding. Later practices required smaller and more regular powders for a variety of industrial applications, and more refined techniques were developed to produce those products, such as media milling. Modern technologies and practices now demand ever-finer particles, measured in microns, thousandths of microns, and even angstroms; and with greater regularity of particle size and purity at these reduced dimensions.

Just as stone wheel grinding could not reliably provide the powders needed for earlier industrial processes, current media mills and similar technologies cannot reliably provide the ultra-fine and ultra-regular particles now required for certain applications.

Various methods for reducing the size of particles have been employed. Many use materials such as spheres, rods or more irregular objects ("grinding media") to crush or beat the material to be reduced ("product material") to smaller dimensions by processes known as grinding, milling, comminution, or dispersion. Grinding media range greatly in size, from ore crushers that are several inches in diameter, down to micron-sized particles that are themselves used to mill much smaller particles. Grinding media also vary greatly in shape, including spherical, semi-spherical, oblate spherical, cylindrical, diagonal, rods, and other shapes (hereinafter "shaped media"), and irregular natural shapes such as grains of sand.

Grinding media are used in various devices such ball mills, rod mills, attritor mills, stirred media mills, pebble mills, etc. Regardless of their differences in design, all mills operate by distributing product material around the grinding media and by causing collisions to occur between grinding media units such that product material particles are positioned between the colliding grinding media units. These collisions cause fracturing of product material particles into to smaller dimensions, an effect known descriptively as "size reduction" or "comminution."

The materials used as grinding media also are frequently used as applied abrasives. For example, such materials are aggregated in molds and held together by a binder such as molten metal that is poured into the mold and cooled, rendering a "hard body" that is impregnated by the binder material. Hard body materials (also known as "hard bodies") of this kind are used in deep-well drilling and other applications. Similar processes are used to impregnate the materials in grinding discs and wheels. Various adhesives are used to bind the materials to textiles, papers and other strata for use as sandpapers, sanding belts, and similar products.

Different grinding and milling techniques produce different mean product material particle sizes and uniformity. Gross differences in result are obtained primarily as a function of the size and shape of the grinding media. Large grinding media produce relatively large and irregular product material particles that are suitable for coarse processes or for further refinement by finer processes. Small grinding media can be used to produce finer and more regular materials as an end in itself, or to alter crystallite aggregates, or to cause mechanochemical alloying, or some combination thereof. Small grinding media are also used for polishing, burnishing, and deburring. Mills are sometimes used in series, with progressively smaller grinding media employed to further reduce product material particle size in stages. Variation of the shape of the grinding media generally affects the regularity of particle size, the efficiency of the milling process, the total cost to achieve a given size reduction, and other factors. These effects generally are well known in the art.

Extremely small particle sizes are proving to be useful for many new applications however, the size reduction and regularity necessary for standardized, acceptable results cannot be achieved by any current milling methods. Production now requires alternate particle fabrication methods such as chemical precipitation, either at a fast rate with unacceptable process variation, or at very slow rates, with unacceptable time and expense.

Other important effects are obtained by varying the composition of the grinding media itself. Three material properties dominantly affect grinding media performance: hardness, mass density, and mechanical toughness. Hardness of the grinding medium determines milling effectiveness, mass density determines milling efficiency, while mechanical toughness determines product purity and overall process efficiency. Hard materials transfer energy efficiently in collisions with product material for effective milling, high-density materials increase the energy transfer per collision with product material and thus increase milling efficiency, especially for small-dimension grinding media, and tough materials can be used for longer periods before they fail and contaminate the product material or otherwise require replacement. An ideal milling material is thus very hard, of very high mass density, and very tough. Preferably, those qualities will hold as the size of the grinding media is reduced, and regardless of the chosen shape of the grinding media.

The history of engineering materials for grinding media is a history of accepting tradeoffs among these material properties, as improvement in one of these factors has previously produced an offsetting reduction in one or more of the others. For example, yttria-stabilized zirconia shows good mechanical toughness, but with low mass density. Various metal media have relatively high mass density, but low mechanical toughness. Carbides showed extreme hardness and mass density, even in small dimensions, but with unavoidable media failures that cause unacceptable product contamination and more general process failures that are incompatible with many applications.

U.S. Pat. No. 5,407,564 (Kaliski) is illustrative. Kaliski discloses a range of high mass density, single-element carbides selected from tungsten, thallium, niobium, and vanadium in sizes ranging between 10 and 100 microns with a requirement of high theoretical density. As Kaliski explains, high theoretical density, nonporous materials are needed. These materials showed impressive results in producing fine and regular product material in small quantities under controlled laboratory conditions. Duplication of his example showed his invention to cause contamination of the milled product, as longer-term and higher-volume production attempts failed due to lack of mechanical toughness that caused metallic and other contamination of product material. High density ceramics without metal binders, such as tungsten carbide combined with tungsten di-carbide, also are disclosed by Kaliski as a means to obtain high milling efficiency but with contamination of product material from the grinding media. Kaliski specifically recommends choosing among his claimed materials to select those whose contaminants provide the most good, or at least do the least damage, to the milled product. These materials changed the nature of but did not resolve the product material contaminant issue, and did not solve the mechanical toughness problem. Rather, these materials tended to fail by degradation into hard, fine and irregular shards that acted as abrasives in the media mill, contaminating the product and on one occasion seriously damaging the mill itself.

U.S. Pat. No. 5,704,556 (McLaughlin) discloses ceramic grinding media without metal binders in dimensions of less than 100 microns diameter. While these materials are acceptably hard, and show greater mechanical toughness than those disclosed in Kaliski, they lack adequate density for many applications or for optimum efficiency in others.

The inventor of the present invention made an effort to make suitable grinding media from available spherical carbides, of which only single element carbides are known in the art. Tungsten carbide/tungsten di-carbide spheres were purchased in conformance to Kaliski's specification and used in a shaker mill, but comminution to the degree cited by Kaliski was not evident. Plasma-processed spherical tungsten carbide/tungsten di-carbide was also purchased from another source, in conformance to Kaliski's specification, in sufficient quantity to test on a production scale. This grinding media fractured due to insufficient mechanical toughness, contaminating the product and extensively damaging the media mill. Tungsten carbide failed due to the lack of mechanical toughness despite experimental variation of media velocity, flow rate, material volume, and other milling variables. Grinding media material in conformance to Kaliski's specification was obtained from several difference sources worldwide, but differences in sourcing produced no significant difference in results. In all attempts with all materials supplied to the Kaliski specification, the level of product contamination was a limitation on usefulness.

U.S. Pat. No. 2,581,414 (Hochberg), U.S. Pat. No. 5,478,705 (Czekai), and U.S. Pat. No. 5,518,187 (Bruno) disclose polymer grinding media which show high mechanical toughness and cause relatively benign product material contamination upon grinding media failure. However, they show low hardness and density relative to ceramics. Polymer grinding media thus can be useful in milling relatively soft product materials that are sensitive to product contamination, and in industries that are relatively insensitive to processing cost, such as in drug processing or in dispersing biological cells for analysis, but they are not appropriate for the majority of industrial applications.

U.S. Pat. Nos. 3,690,962, 3,737,289, 3,779,745, and 4,066,451 (all to Rudy) disclose certain multi-carbides for use as cutting tools. Although the multi-carbides disclosed showed a combination of hardness, density and mechanical toughness that promised to be useful for milling, the known geometries for available multi-carbide materials rendered them incompatible with such use. Difficulties included the large size of multi-carbide material that is produced by current manufacturing methods, and difficulty in machining or otherwise manipulating the material into sizes and shapes useful for milling due in part to its hardness and mechanical toughness.

V. N. Eremenko, et al, "Investigations of alloys or the ternary systems W—HfC—C and W—ZrC—C at subsolidus temperatures," Dokl. Akad. Nauk. Ukr. SSSR, Ser. A No. 1, 83-88 (1976); L. V. Artyukh, et al, "Physicochemical reactions of tungsten carbide with hafnium carbide," Izv. Akad. Nauk SSSR, Neorg. Mater., No. 4, 634-637 (1976); and T. Ya. Velikanova, et al, "Effect of alloying on the structure and properties of cast WC1-x Materials," Poroshkovaya Metallurgiya, No. 2 (218), 53-58, (1981) teach how sensitive the properties of single element carbides can be to small additions of other carbide forming elements. This fact has greatly inhibited research into multi-carbide elements.

As summarized above, the grinding media of the prior art all suffer some technical disadvantage resulting in a proliferation of grinding media materials creating a significant economic burden and also resulting in technically inferior milled products due to contamination.

SUMMARY OF THE INVENTION

Briefly stated, grinding media includes shaped media, such as spheres or rods, ranging in size from 0.5 micron to 100 mm in diameter. The media are of a multi-carbide material consisting essentially of two different carbide-forming elements and carbon, either with or without an elemental form of a carbide-forming element. The media have extremely high mass density, extreme hardness, and extreme mechanical toughness.

According to an embodiment of the invention, grinding media include a multi-carbide material consisting essentially of carbon and at least two different carbide-forming elements wherein the multi-carbide material is formed into shaped grinding media ranging in size from 0.5 micron to 100 mm in diameter.

According to an embodiment of the invention, a method for making grinding media includes the step of forming the media from a multi-carbide material consisting essentially of carbon and at least two different carbide-forming elements wherein the multi-carbide material is formed as grinding media for use in a media mill.

According to an embodiment of the invention, a method for making spheres for use in cladding materials includes the step of forming the spheres from a multi-carbide material consisting essentially of carbon and at least two different carbide-forming elements.

According to an embodiment of the invention, a method for making spheres for use in surfacing material includes the step of forming the spheres from a multi-carbide material consisting essentially of carbon and at least two different carbide-forming elements.

According to an embodiment of the invention, a method for making spheres for use in hard body materials includes the step of forming the spheres from a multi-carbide material consisting essentially of carbon and at least two different carbide-forming elements.

According to an embodiment of the invention, a method for making grinding media includes the step of forming the media from a multi-carbide material consisting essentially of carbon and one element selected from the group consisting of chromium, hafnium, niobium, tantalum, titanium, tungsten, molybdenum, vanadium, and zirconium, along with the elemental metal of the carbide.

According to an embodiment of the invention, a method for making spheres for use in cladding material includes the step of forming the spheres from a multi-carbide material consisting essentially of carbon and one element selected from the group consisting of chromium, hafnium, molybdenum, niobium, rhenium, tantalum, thallium, titanium, tungsten, vanadium, and zirconium, along with the elemental metal of the carbide.

According to an embodiment of the invention, a method for making spheres for use in surfacing material includes the step of forming the spheres from a multi-carbide material consisting essentially of carbon and one element selected from the group consisting of chromium, hafnium, molybdenum, niobium, rhenium, tantalum, thallium, titanium, tungsten, vanadium, and zirconium, along with the elemental metal of the carbide.

According to an embodiment of the invention, a method for making spheres for use in hard body material includes the step of forming the spheres from a multi-carbide material consisting essentially of carbon and one element selected from the group consisting of chromium, hafnium, molybdenum, niobium, rhenium, tantalum, thallium, titanium, tungsten, vanadium, and zirconium, along with the elemental metal of the carbide.

According to an embodiment of the invention, a method for milling a product in a media mill includes the step of using media consisting essentially of a multi-carbide material which consists essentially of carbon and at least two carbide-forming elements wherein the multi-carbide is formed as media for use in a media mill.

According to an embodiment of the invention, a method for milling a product in a media mill includes the step of using carbide media consisting essentially of carbon and one element selected from the group consisting of chromium, hafnium, molybdenum, niobium, rhenium, tantalum, thallium, titanium, tungsten, vanadium, and zirconium, along with the elemental metal of the carbide.

DETAILED DESCRIPTION OF THE PREFERRED EMBODIMENT

Figure 1:
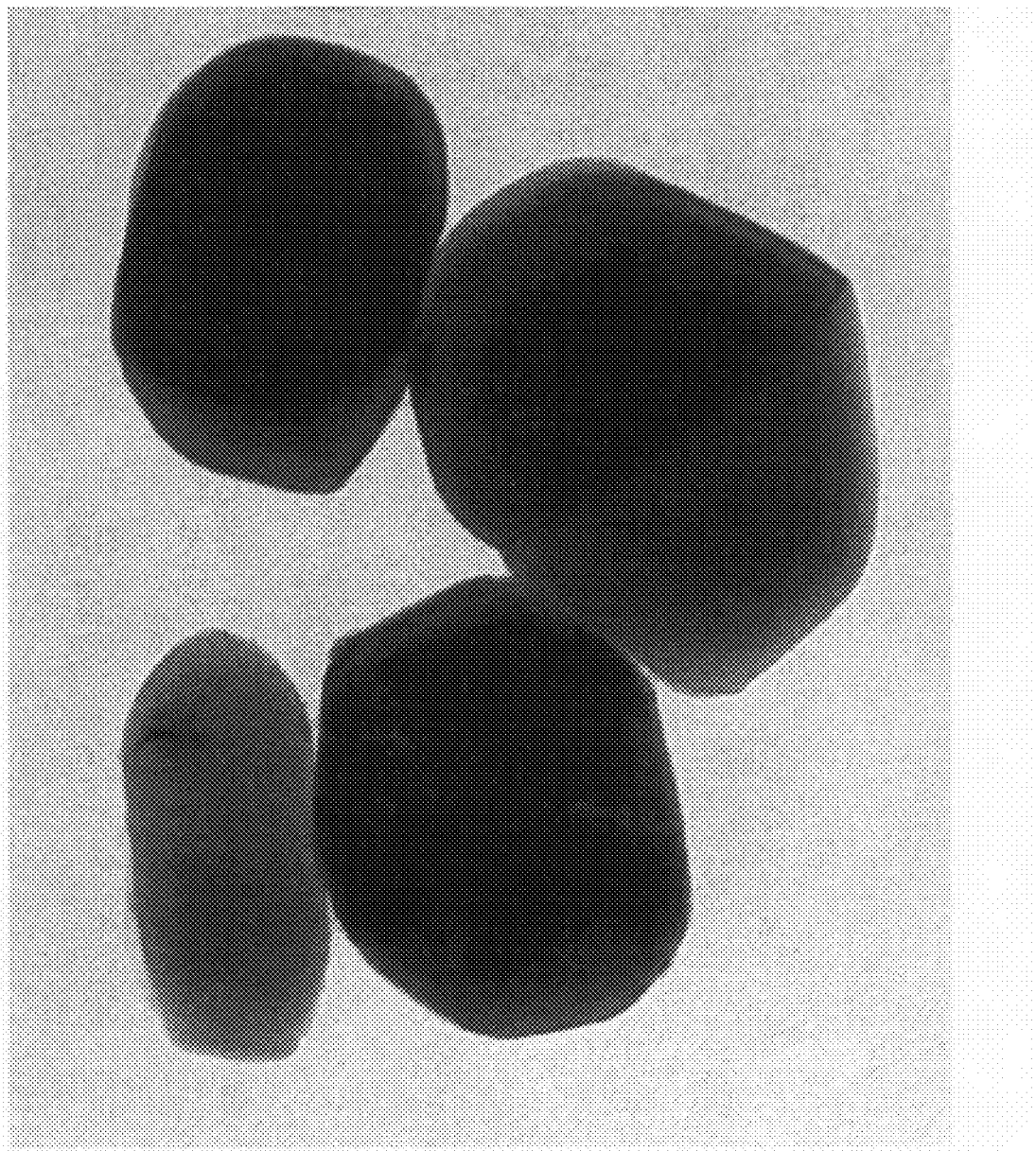
FIG. 1 shows particles produced according to the prior art.

According to the present invention, a compound is formed from a combination of carbon and two or more different carbide-forming elements ("multi-carbide material", defined more fully below). Multi-carbide materials have extreme hardness, extreme density, and extreme mechanical toughness. In the present invention, the selection of carbide-forming elements of the multi-carbide materials, and the precise proportional composition for any combination of those elements, is modified to alter the properties of the material. Multi-carbide material is combined with one or more elemental metals of the chosen carbide to alter ductility and other properties of the material. Multi-carbide material is formed effectively and efficiently into a variety of shaped media, preferably into spheres, by the use of novel manufacturing methods.

The manufacturing method of the present invention maintains proper element composition to optimize desired material properties, produces useful shaped media, avoids crushing or other degradation of the material to create said shaped media, and greatly lowers manufacturing cost to produce shaped media formed from such material while improving the quality of the material obtained. The manufacturing method produces small and regular spheres of optimized multi-carbide material that is suitable for use as grinding media in media mills ("multi-carbide grinding media"). The multi-carbide grinding media of the present invention are used in shaped media ranging in size from 100 mm or more down to 0.5 microns or less while maintaining their effective material properties. The multi-carbide grinding media are used in media mills and other extant milling processes of varying design and capacity. By such use of such multi-carbide grinding media, greater product material size reduction, size regulation, and purity can be achieved than by utilization of extant milling media materials.

Such use improves the efficiency and outcome of current particle size reduction methods. Less effective methods could be used as preliminary process steps to produce particles of relatively great size and irregularity, with those particles being further refined by the invention.

The multi-carbide grinding media of the present invention are used effectively in a variety of applications other than media mills, such as the manufacture of hard bodies, grinding wheels, abrasive papers and textiles, cladding materials, and hard coating materials.

The invention permits the manufacture of materials in dimensions and purities that previously were unattainable ("ultra-fine particles"). Ultra-fine particles will enable the manufacture of products previously unattainable, or attainable only by less effective or more expensive methods. Examples include sub-micron sized oxides, such as oxides of titanium. Reduction of certain oxides of titania with sufficiently low impurities causes that compound to exhibit special properties including high transparency. Fine size reduction of pigments improve the efficiency of color distribution in dyes and paints. Similar results are obtained by high refinement of varnishes and other finishes. Ultra-fine particles of certain metals and other materials, such as cobalt, hydrides, molybdenum, nitrides, titanium, tungsten, and various alloys and other compounds of the same, will permit the manufacture of those materials at previously-unachieved economic or performance properties and in superalloy and other combinations not previously obtainable. Diamond particles can be reduced to dimensions not previously obtainable due to their hardness relative to known grinding media, permitting more efficient use of diamond particles at reduced cost. Ultra-fine particles will become available that can be formed by molding, electrostatic deposition and other known methods into microelectromechanical products and other micron-scale devices that previously were obtainable only by etching of glass or silicon or other semiconductors. Ultra-fine particles can be introduced to certain liquids to form fluids that exhibit special properties of heat transmission, solubility and other qualities.

Through use of the invention, samples produced either by more coarse milling or by high-rate precipitation are further refined through milling process with multi-carbide grinding media to preferred specifications at high speed and relatively low cost. Other valuable materials are made uniquely possible by the claimed methods of the invention.

The invention also permits the manufacture of ultra-fine particles with geometries superior to those achieved by known manufacturing methods. For example, chemical precipitation can create particles of certain materials in extremely small dimensions. Those particles, however, generally exhibit smooth and rounded shapes. FIG. 1 shows particles that were assembled atomistically by precipitation. Such particles are also typical of those particles produced by known means such as sol gel, vapor phase condensation, etc. The science dealing with the surface topography of particles speaks in terms of a fractured surface which has discernible cleavage facets and cleavage steps. These two features are specifically absent from the particles produced by the known processing methods for producing very small particles. Another missing feature in particles produced according to prior art methods is concavity. Concavity is defined as that condition where some portion of the surface lies beneath the surrounding surface. In precipitated particles, the surface is bulbous, meaning that a portion of the surface protrudes above the surrounding surface such as is always true in the case of a sphere.

Figure 2:
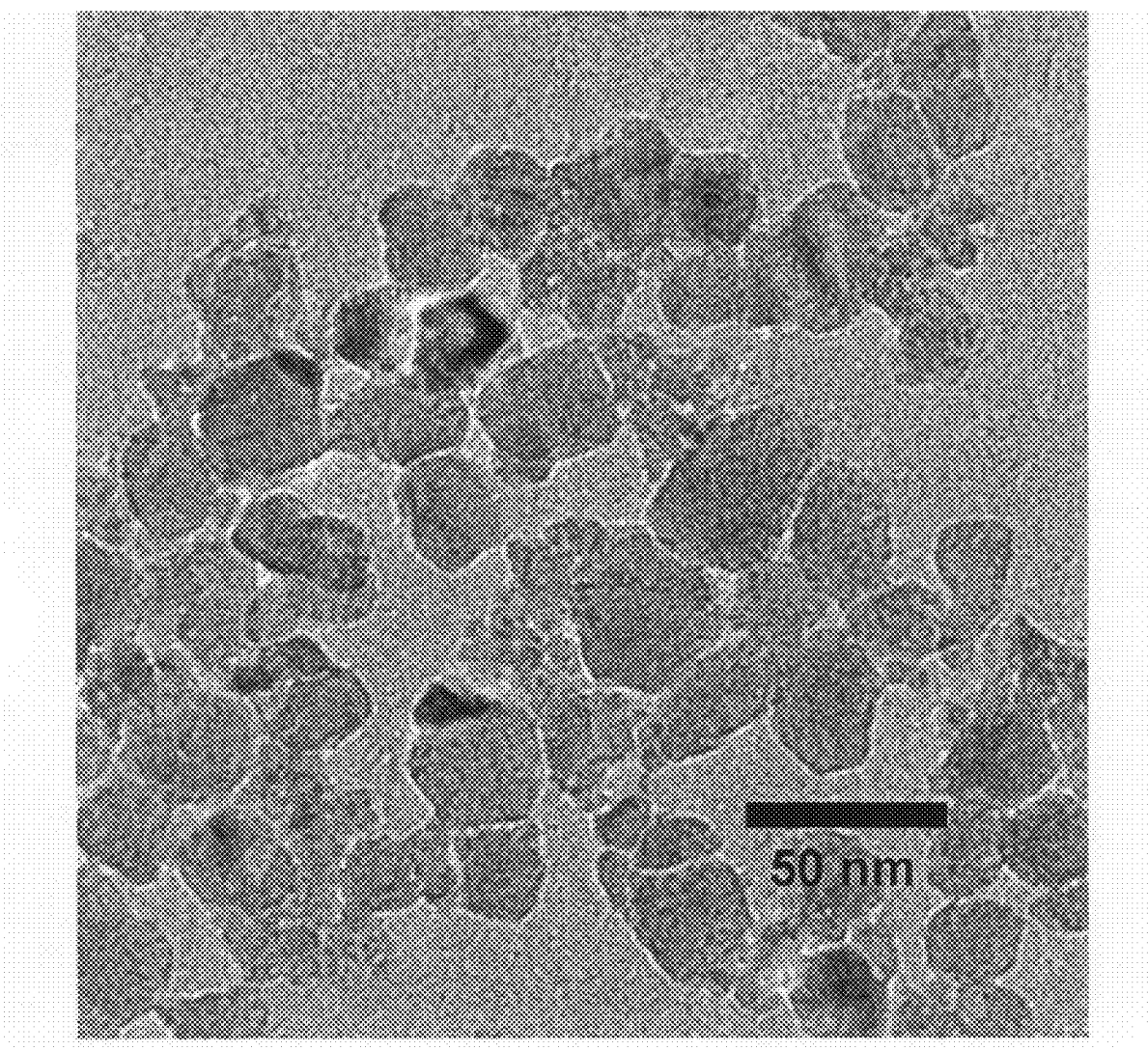
FIG. 2 shows particles produced according to an embodiment of the present invention.

As shown in FIG. 2, ultra-fine particles produced by milling according to the present invention exhibit more angular geometries with cleaved surfaces and angular intersecting surfaces that exhibit higher activity relative to the materials formed by other means, causing ultra-fine milled particles to tend to exhibit superior chemical and mechanical properties over particles of similar size and dimension that are manufactured by precipitation and similar methods. Note the corners, flat edges, etc. of the very small particles produced by the milling method of the present invention.

A catalyst produced according to the present invention is less than $30 \times 10^{-9}$ meters in all dimensions and possesses cleaved surfaces, the catalyst being uniquely distinguishable by its particle surface features having a preponderance of cleavage facets and/or cleavage steps, the catalyst alternatively being uniquely distinguishable by the acutance of a preponderance of intersecting surfaces in which the arc length of the edge is less than the radius of the edge, the catalyst alternatively being uniquely distinguishable by surface concavities greater than 5% of the particle diameter, the catalyst alternatively being uniquely distinguishable by the acutance of a preponderance of intersecting surfaces in which the included angle of the edge radius is about, or less than, the included angle of the intersecting surfaces.

Intermetallic particles produced according to the present invention have less than $30 \times 10^{-9}$ meters in all dimensions and possess cleaved surfaces. The product is uniquely distinguishable by its particle surface features having a preponderance of cleavage facets and/or cleavage steps, the product alternatively being uniquely distinguishable by the acutance of a preponderance of intersecting surfaces in which the arc length of the edge is less than the radius of the edge, the catalyst alternatively being uniquely distinguishable by surface concavities greater than 5% of the particle diameter, the product alternatively being uniquely distinguishable by the acutance of a preponderance of intersecting surfaces in which the included angle of the edge radius is about, or less than, the included angle of the intersecting surfaces.

The grinding media of the present invention are also useful in other fields. Examples include the manufacture of "hard bodies" for drilling or grinding, laser cladding and other cladding processes, use as surface materials, and other applications. For instance, grinding media are used without media mills as a component of alloys to be applied to surfaces for improved wear resistance. Two common methods of applying such protective coatings are known as cladding and surfacing. Each of these have many methods employed, the choice of which depending on the object and alloy to be treated. Generically, binder materials such as polymers or metals are used to hold grinding media onto the surface of the object being treated by cladding or surfacing. The binder materials are melted or cast into place along with the grinding media material which itself is not melted during the cladding or surfacing operation. Typical melting methods include laser, furnace melting, welding tubes and plasma heat sources. When in use, the binder material itself often cannot withstand the wear imposed on the surface by the operating environment such as in oil well drilling. This binder wear exposes the grinding media to the surface, thereby providing a wear resisting surface protection. These same surfaces are often exposed to very high shock impacts which the grinding media is able to withstand.

To create multi-carbide grinding media, a compound ("multi-carbide material") is formed from carbon and at least two carbide-forming elements. U.S. Pat. Nos. 3,690,962, 3,737,289, 3,779,745, and 4,066,451 (all to Rudy), incorporated herein by reference, disclose how to make such multi-carbide materials for use as cutting tools.

In an embodiment of the invention, the multi-carbide material is formed from carbon and carbide-forming elements selected from the group consisting of chromium, hafnium, molybdenum, niobium, rhenium, tantalum, thallium, titanium, tungsten, vanadium, zirconium, and any other carbide forming element. Multi-carbide material can be formed either with or without some of the carbide-forming elements not being fully carburized and thus remaining in the material in its elemental state. The multi-carbide material can contain a certain amount of impurities and other extraneous elements without significantly affecting its material properties.

The production of spheres from irregular shaped particles can be achieved by various means. One common method of processing ultrahigh melting point materials into spheres is with the use of a thermal plasma torch. Such a torch can operate at temperatures well beyond the melting point of all multi-carbide materials. Other methods, such as melt atomization or arc melting, are known to those familiar with the art and there is no intention to limit the practice to just the use of these named methods. In short, any known technique for applying heat which brings the material to its melting point will work. How to form other shaped media is also known in the art.

The known methods of forming spheres from carbides also form spheres when the known methods are applied to multi-carbide materials, but the acceptable spheres amount to approximately 40% of the total produced. A new method for producing spheres from multi-carbide materials was therefore developed. According to an embodiment of the invention, the method for producing spheres from multi-carbide materials is as follows. The multi-carbide material is formed into spheres preferably by admixing fine particles of the elements intended to comprise the multi-carbide material in appropriate ratios, by adequately mixing the components, by maintaining the stability of the mixture by introduction of an inert binding agent, by subdividing the mixture into aggregates each having a mass approximately equal to that of the desired sphere to be formed, by applying heat to the subdivided aggregate sufficient to cause its elements to fuse, and by cooling the fused sphere in a manner that preserves its spherical shape. This manufacturing process is used to make small and regular spheres that are composed of multi-carbide material. Spheres of very small diameters, i.e., less than 500 microns diameter and down to 0.5 microns diameter, with regular geometries and predictable, optimized compositions can be produced.

Spheres of multi-carbide material can be formed in this manner by the use of a thermal plasma torch or vertical thermal tube to raise the temperature of the multi-carbide particles above their melting point as they pass through the plasma or down the tube. Other methods that can so raise the temperature of the multi-carbides, such as melt atomization or arc melting, also should be effective.

Such spheres can be utilized as grinding media in media mills ("multi-carbide grinding media"), as the grinding medium in a hard body drill bit or grinding wheel, as the abrasive medium for "sand blasting" shaping techniques, and in other applications.

Shapes other than spheres can be formed. For example, a variety of shapes can be formed by molding and sintering sufficiently small particles of the multi-carbide material. The geometry of such shapes can be varied nearly arbitrarily to achieve different grinding properties. The manufacturing process is an improvement over the current art in that it forms multi-carbides by processes that better mix and do not vaporize elements during manufacture, improving predictability and performance characteristics of the produced material; and that do not crack or otherwise degrade the material as it is formed into useful shapes, to improve the mechanical toughness of the produced material.

The multi-carbide grinding media, of whatever shape, can be used in media mills to achieve efficient and thorough comminution of materials with high purity due to the extreme hardness, extreme density, and extreme mechanical toughness of the material, independent of size or shape. In such applications, particles of product material to be reduced in size are admixed with the colliding grinding media. The product material particles, interspersed between the grinding media units, are rapidly reduced in size. Reductions to controlled dimensions as small as $10^{-9}$ meters can be achieved and readily reproduced with the right combination of initial source material, grinding media and media mill or other reduction process. Due to the engineered material properties of the multi-carbide grinding media, the wear rates of the grinding media units are extremely low and their grinding effectiveness is very high, enabling the efficient conversion of coarse particles into extremely small product size while maintaining high purity. That is, the multi-carbide grinding media deliver virtually no contamination to the product material.

Separation of product from the multi-carbide grinding media is accomplished by various means known in the art, such as washing and filtering or gravity separation. The product particles are much smaller than the grinding media, so separation can be accomplished efficiently and effectively.

Selection of appropriate grinding media material is critical to outcome. Very small variations in the chemical composition of a material can have a great effect upon its performance as a grinding or milling medium. Changes of <0.1 at % of a given element in a carbide have been shown to cause changes of 40% or more in hardness, mechanical toughness, or other important property of the compound.

All of the above compositional and processing considerations for producing microspheres of superior performance for milling also apply for producing spheres of the present invention for laser cladding, other surfacing techniques, and hard bodies.

For example, the media of the present invention include mill media of any geometry composed of multiple carbide-forming elements, with carbon, having a density greater than 8 gm/cc and a combination of hardness and toughness sufficient to permit use in a media mill without contamination of the milled product to an amount greater than 800 ppm.

According to the present invention, a method for making spheres, composed of multiple carbide-forming elements, with carbon, for use as mill media, or in cladding material, as surfacing material, or in hard body materials containing these spheres, includes the steps of:

(a) obtaining fine particles of appropriate compositions to form the desired composition;

(b) admixing the particles in appropriate ratios to form the desired composition and for adequate mixing of components;

(c) subdividing the mixture into aggregates each having a weight about that of the desired sphere size range; and (d) fusing the aggregates to at least 90% theoretical density by any means providing temperature, and time at temperature, appropriate for fusion of the components.

According to the present invention, a method for producing fine oxides of any metal but in particular titanium, being of a size less than 3 microns and including down to $1 \times 10^{-9}$ using larger particles of oxides of titanium, includes the steps of:

(a) obtaining large particles of oxides, especially of titanium, because such oxide particles are typically much cheaper to procure than fine particles of oxides of titanium, hereinafter such particles being termed feed oxides;

(b) processing the feed oxides in a media mill using spheres of multi-carbide materials with a mass density greater than 8 gm/cc and a hardness and toughness sufficient so as not to contaminate the milled oxides of titanium to a degree greater than 200 ppm; and (c) processing the feed oxides at an energy intensity to cause size reduction of the feed oxide, in a dry or wet media mill, for a period of time sufficient to reduce the particle size to the preferred size. Such oxides are useful for applications such as pigments, fillers, gas sensors, optronic devices, catalyst, and the manufacture of ceramics, manufacture of components, while being more economic to produce than those obtained by other methods.

According to the present invention, a method for producing highly transparent oxides of titanium includes the steps of:

(a) obtaining a slurry of not adequately transparent titania;

(b) processing the titania slurry in a media mill using spheres of multi-carbide material with a mass density greater than 8 gm/cc and a hardness and toughness sufficient to not contaminate the milled oxides of titanium to a degree greater than 100 ppm; and (c) processing the slurry until the size distribution of the particles has a D100 of $90 \times 10^{-9}$ meters or less.

According to the present invention, a method for producing titanium metal includes the steps of:

(a) obtaining titania feed material, where the feed material is from a high purity source such as readily available chloride processed titania;

(b) processing the titania in a media mill using spheres of multi-carbide material with a mass density greater than 8 gm/cc and a hardness and toughness sufficient not to contaminate the milled oxides of titanium to a degree greater than 800 ppm;

(c) processing the titania at an energy intensity to cause size reduction of the feed oxide, in a dry or wet media mill, for a period of time sufficient to reduce the particle size to about $200 \times 10^{-9}$ meters or less;

(d) chemically reducing the titania to titanium metal using a reducing agent such as hydrogen in combination with another reducing agent, if needed, such as a carbothermic reduction agent such as CO or carbon under conditions suitable for oxide reduction without the formation of titanium carbide;

(e) either removing the titanium metal from the reduction equipment without exposure to oxygen or nitrogen under conditions causing oxidation or nitridation of the ultrafine titanium metal or raising the temperature of the ultrafine titanium metal to cause fusion of the particles before removal from the reduction equipment. Other reducing agents are known in the art.

The present invention can be used for producing diamond particles of less than about $100 \times 10^{-9}$ meters in all dimensions and, if desired, of a tight particle size distribution, with the diamond particles being usable for CMP (chemical mechanical polishing) and other polishing applications. According to the present invention, a method for producing such diamond includes the steps of:

(a) obtaining industrial diamonds of suitable feed material size;

(b) processing the diamonds in a media mill using spheres of multi-carbide material with a mass density greater than 8 gm/cc and a hardness and toughness sufficient cause size reduction of the diamond material;

(c) processing the diamonds at an energy intensity to cause size reduction of the diamond particles, in a dry or wet media mill, for a period of time sufficient to reduce the particle size to between about $100 \times 10^{-9}$ meters and about $2 \times 10^{-9}$ meters;

(d) purifying the processed diamonds, if necessary to remove contaminants, by chemical dissolution of impurities or by other methods known in the art.

According to the present invention, a method for producing devices of silicon or other semiconductors or other materials, of micro or nanoscale dimensions, typically called MEMS, by building the device with ultrafine particles rather than substractively forming the device from solid semiconductor material with etching or other methods, includes the steps of:

(a) obtaining particulate feed material of the desired composition or combinations of particulate materials to be composed into a target composition;

(b) processing the feed material in a media mill using spheres of multi-carbide material with a mass density greater than 8 gm/cc and a hardness and toughness sufficient not to contaminate the milled feed material to a degree greater than 200 ppm;

(c) processing the feed material at an energy intensity to cause size reduction, in a dry or wet media mill, for a period of time sufficient to reduce the particle size to about $200 \times 10^{-9}$ meters or less and more preferably to $50 \times 10^{-9}$ meters or less;

(d) forming the processed particulates into a molded article, by means known in the art such as pressure molding, injection molding, freeze molding, electrophoretic shaping, electrostatic deposition and other known methods; whereby the forming method allows for creation of unique MEMS devices whereby different parts of the structure can have different materials of construction; and (e) fusing the molded article to sufficient density to have properties adequate for the intended performance of the device, where such properties are determined specifically by the design application.

According to the present invention, a method for producing fine SiC of a size less than 1 micron and including down to 0.001 microns using larger particles of SiC includes the steps of:

(a) obtaining large particles of SiC because such large particles are typically much cheaper to procure than fine particles of SiC, these particles being termed feed particles;

(b) processing the feed particles in a media mill using spheres of multi-carbide material with a mass density greater than 8 gm/cc and a hardness and toughness sufficient not to contaminate the milled particles to a degree greater than 600 ppm; and (c) processing the feed particles at an energy intensity to cause size reduction of the feed particles, in a dry or wet media mill, for a period of time sufficient to reduce the particle size to the preferred size; with such particles being useful for the manufacture of silicon carbide ceramic bodies, ceramic bodies containing silicon carbide in the composition, applications such as pigments, polishing compounds, polymer fillers, sensors, catalyst, and the manufacture of ceramics, manufacture of components and also being more economic than that obtained by other methods.

According to the present invention, a method for producing fine Al2O3 being of a size less than 1 micron and including down to 0.001 microns using larger particles of Al2O3 includes the steps of:

(a) obtaining large particles of Al2O3. Such large particles are typically much cheaper to procure than fine particles of Al2O3. These particles are termed "feed particles."

(b) processing the feed particles in a media mill using spheres of multi-carbide materials with a mass density greater than 8 gm/cc and a hardness and toughness sufficient not to contaminate the milled particles to a degree greater than 600 ppm; and (c) processing the feed particles at an energy intensity to cause size reduction of the feed particles, in a dry or wet media mill, for a period of time sufficient to reduce the particle size to the preferred size. Such particles are useful for the manufacture of alumina ceramic bodies, ceramic bodies containing alumina in the composition, applications such as pigments, polishing compounds, polymer fillers, sensors, catalyst, and the manufacture of ceramics, manufacture of components and also are more economic than that obtained by other methods.

According to the present invention, a method for producing nanofluids having suspended particles with a size distribution of $D50=30 \times 10^{-9}$ or less includes the steps of:

(a) obtaining particulate feed material of the desired composition;

(b) processing the feed material in a media mill using spheres of multi-carbide material with a mass density greater than 8 gm/cc and a hardness and toughness sufficient to not contaminate the milled feed material to a degree greater than 400 ppm;

(c) processing the feed material at an energy intensity to cause size reduction, in a dry or wet media mill, for a period of time sufficient to reduce the particle size to a milled product of about $200 \times 10^{-9}$ meters or less and more preferably to $50 \times 10^{-9}$ meters or less and most preferably to $10 \times 10^{-9}$ meters or less;

(d) concentrating the milled product in suitable carrier fluid, such carrier fluids being specified by the application and including water, oil, and organics, with the degree of concentration of particulate material in the fluid being specified by the application.

According to the present invention, a method for producing fine tungsten particles of a size less than $400 \times 10^{-9}$ meters and including down to $1 \times 10^{-9}$ meters using larger particles of tungsten, including the steps of:

(a) obtaining large particles of tungsten because large particles are typically much cheaper to procure than fine particles of tungsten, with the particles being termed feed particles;

(b) nitriding the feed material, such nitride being known to be brittle, by known methods of nitriding such as heating tungsten in dissociated ammonia at 500 degrees C. for a length of time proportionate to the feed material size but sufficient to cause nitridation;

(c) processing the nitrided feed particles in a media mill using spheres of multi-carbide material with a mass density greater than 8 gm/cc and a hardness and toughness sufficient not to contaminate the milled particles to a degree greater than 900 ppm;

(d) processing the feed particles at an energy intensity to cause size reduction of the feed particles, in a dry or wet media mill, for a period of time sufficient to reduce the particle size to the preferred size; and (e) if desired, denitriding the tungsten nitride particulates by heating to about 600 degrees C. or higher by methods now known in the art. Such particles are useful for the manufacture of tungsten bodies, tungsten alloy bodies, ceramic bodies containing tungsten in the composition, applications such as pigments, polishing compounds, electronic inks, metallo-organic compounds, polymer fillers, sensors, catalyst, and the manufacture of metal-ceramics, manufacture of components and are also more economic than that obtained by other methods.

According to the present invention, a method for producing tungsten components, or tungsten alloy components, from the fine tungsten particles produced by the method detailed in the preceding paragraph, includes the steps of:

(a) obtaining nitrided tungsten milled product of a size less than $400 \times 10^{-9}$ meters and more preferably less than $100 \times 10^{-9}$ meters and most preferably of less than $50 \times 10^{-9}$ meters;

(b) producing tungsten metal components by powder metallurgy processing by consolidation and forming the tungsten nitride prior to denitridation;

(c) denitriding the tungsten nitride component during heating to sintering temperatures with the release of nitrogen contributing to flushing residual gases from between the particles; and (d) sintering the formed component at temperatures proportionate to the particle size, with these temperatures being substantially less than now required in the art for commercially available tungsten powders.

According to the present invention, a method for producing fine molybdenum particles of a size less than $400 \times 10^{-9}$ meters and including down to $1 \times 10^{-9}$ meters using larger particles of molybdenum includes the steps of:

(a) obtaining large particles of molybdenum, such large particles typically being much cheaper to procure than fine particles of molybdenum, said particles being termed feed particles;

(b) nitriding the feed material, such nitride being known to be brittle, by known methods of nitriding such as heating molybdenum in dissociated ammonia at about 500 degrees C. for a length of time proportionate to the feed material size but sufficient to cause nitridation;

(c) processing the nitrided feed particles in a media mill using spheres of multi-carbide material with a mass density greater than 8 gm/cc and a hardness and toughness sufficient to not contaminate the milled particles to a degree greater than 900 ppm;

(d) processing the feed particles at an energy intensity to cause size reduction of the feed particles, in a dry or wet media mill, for a period of time sufficient to reduce the particle size to the preferred size; and (e) if desired, denitriding the molybdenum nitride particulates by heating to about 600 degrees C. or higher by methods now known in the art. Such particles are useful for the manufacture of molybdenum bodies, molybdenum alloy bodies, ceramic bodies containing molybdenum in the composition, electronic inks, metallo-organic compounds, applications such as pigments, polishing compounds, polymer fillers, sensors, catalyst, and the manufacture of metal-ceramics, manufacture of components and also are more economic than particles obtained by other methods.

According to the present invention, a method for producing molybdenum or molybdenum alloy components from particles produced according to the method of the preceding paragraph include the steps of:

(a) obtaining nitrided molybdenum milled product of a size less than $400 \times 10^{-9}$ meters and more preferably less than $100 \times 10^{-9}$ meters and most preferably of less than $50 \times 10^{-9}$ meters;

(b) producing molybdenum metal or alloy components by powder metallurgy processing by consolidation and forming the molybdenum nitride prior to denitridation;

(c) denitriding the molybdenum nitride during heating to sintering temperatures with the release of nitrogen contributing to flushing residual gases from between the particles; and (d) sintering the formed component at temperatures proportionate to the particle size, where these temperatures are substantially less than now required in the art for commercially available molybdenum powders.

According to the present invention, a method for producing fine cobalt particles or cobalt nitride particles being of a size less than 5 microns and including down to $1 \times 10^{-9}$ meters using larger particles of cobalt includes the steps of:

(a) obtaining large particles of cobalt or cobalt nitride, such large particles typically being gas atomized and therefore much cheaper to procure than fine particles of cobalt or cobalt nitride, with such particles being termed feed particles;

(b) nitriding the feed material, if not already nitrided, such nitride being known to be brittle, by known methods of nitriding such as heating cobalt in dissociated ammonia at about 600 degrees C. for a length of time proportionate to the feed material size but sufficient to cause nitridation;

(c) processing the nitrided feed particles in a media mill using spheres of multi-carbide material with a mass density greater than 8 gm/cc and a hardness and toughness sufficient not to contaminate the milled particles to a degree greater than 500 ppm;

(d) processing the feed particles at an energy intensity to cause size reduction of the feed particles, in a dry or wet media mill, for a period of time sufficient to reduce the particle size to the preferred size; and (e) if desired, denitriding the cobalt nitride particulates by heating to about 600 degrees C. or higher by methods now known in the art. Such particles are useful for the manufacture of catalyst, alloy bodies containing cobalt, ceramic bodies containing cobalt in the composition, electronic inks, metallo-organic compounds, applications such as pigments, polishing compounds, polymer fillers, sensors, catalyst, promoters, the manufacture of superalloy components containing cobalt, for use in the hard metals industries where cobalt is a binder metal and also are more economic to produce than those obtained by other methods.

According to the present invention, a method for producing fine metal particles from metal nitrides, being of a size less than 20 microns and including down to $1 \times 10^{-9}$ meters using larger particles of metals includes the steps of:

(a) obtaining large particles of metal or metals nitride from that group of metals having nitrides that dissociate when heated from 300 degrees C. to about 900 degrees C., such large particles typically being gas atomized and therefore much cheaper to procure than fine particles of metals or metals nitride, such particles being termed feed particles;

(b) nitriding the feed material, if not already nitrided, such nitride being known to be more brittle than metal which is ductile, by known methods of nitriding such as heating metals particles in dissociated ammonia at a temperature sufficient to cause nitridation for a length of time proportionate to the feed material size but sufficient to cause nitridation;

(c) processing the nitrided feed particles in a media mill using spheres of multi-carbide material with a mass density greater than 8 gm/cc and a hardness and toughness sufficient not to contaminate the milled particles to a degree greater than 900 ppm;

(d) processing the feed particles at an energy intensity to cause size reduction of the feed particles, in a dry or wet media mill, for a period of time sufficient to reduce the particle size to the preferred size; and (e) if desired, denitriding the metals nitride particulates by heating to about 600 degrees C. or higher by methods now known in the art. Such particles are useful for the manufacture of catalyst, alloy bodies containing metals, ceramic bodies containing metals in the composition, electronic inks, metallo-organic compounds, applications such as pigments, polishing compounds, polymer fillers, sensors, catalyst, promoters, the manufacture of superalloy components, the manufacture of metal components combining various metals processed by this claim, for use in the hard metals industries where metals is a binder metal and also are more economical to produce than those obtained by other methods.

According to the present invention, a method for producing fine metal particles or metal hydride particles from metal hydrides such as titanium and tantalum, being of a size less than $300 \times 10^{-9}$ meters and including down to $1 \times 10^{-9}$ meters using larger particles of metals includes the steps of:

(a) obtaining large particles of metal hydrides from that group of metals forming hydrides that dissociate when heated, such large particles typically being pressure hydrided and therefore much cheaper to procure than fine particles of metals or metal hydrides, with such particles being termed feed particles;

(b) processing the hydrided feed particles in a media mill using spheres of multi-carbide material with a mass density greater than 8 gm/cc and a hardness and toughness sufficient not to contaminate the milled particles to a degree greater than 900 ppm;

(c) processing the feed particles at an energy intensity to cause size reduction of the feed particles, in a dry or wet media mill, for a period of time sufficient to reduce the particle size to the preferred size; and (d) if desired, dehydriding the ultrafine metals hydride particulates by heating to the dehydration temperature by methods now known in the art. Such particles are useful for the manufacture of catalyst, alloy bodies containing metals, ceramic bodies containing metals in the composition, electronic inks, metallo-organic compounds, applications such as pigments, polishing compounds, polymer fillers, sensors, catalyst, promoters, the manufacture of superalloy components, the manufacture of metal components combining various metals processed by this claim, for use in the hard metals industries where metals is a binder metal and also being more economic than that obtained by other means As discussed in the Background section, the search for an optimal material to be used as mill media has been ongoing. After much experimentation and testing, multi-carbides were identified by the inventor as a possible material. Although the multi-carbides disclosed by the Rudy patents showed a combination of hardness, density and mechanical toughness that promised to be useful for milling, the known geometries for available multi-carbide materials rendered them incompatible with such use. Difficulties included the large size of multi-carbide material that is produced by current manufacturing methods, and difficulty in machining or otherwise manipulating the material into sizes and shapes useful for milling due in part to its hardness and mechanical toughness.

After extensive analysis and experimentation, the effectiveness of using multi-carbide grinding media was shown empirically in the following experiment. Spheres according to the present invention were formed by taking material composed of Ti, W, and C and preparing spheres 150 microns in diameter. The test composition in this example was 86.7 wt % tungsten, 4.5 wt % carbon, and the balance titanium. Agglomerates of particulates of this test composition were spheridized in an RF Plasma spray unit. The density of the material was confirmed as being the same as the multi-carbide material that was sought to be made.

The multi-carbide spheres of the present invention were then subjected to hardness testing. A compression test was employed in which a single small sphere was isolated between two pieces of ground tungsten plate and a force was applied to one of the plates. The intention was to increase the applied pressure until the sphere fragmented due to the extreme load at the point contact between the plate and the sphere. Unexpectedly, spheres of the test composition did not fracture, but instead embedded into the tungsten plate, demonstrating hardness of the test material well above that of pure tungsten. In a second test, several spheres were positioned between two tungsten plates and the top plate was struck with a weight so as to induce high transitory g-forces on the spheres. None of the spheres fractured, with many of the spheres embedded into the tungsten plate. In two instances of the experiment, the tungsten plate fractured and cleaved, but with no apparent damage to the spheres. In another experiment, spheres of the test composition were placed between two ground glass plates. Upon applying pressure, the glass micro-fragmented around its points of contact with the spheres, but no damage to the spheres was observed.

The multi-carbide spheres were subjected to mechanical toughness testing. Spheres of the test composition were placed in a vibratory mill with calcium carbide and agitated for a period of time sufficient to cause significant grinding media degradation by all known grinding media. No evidence of contamination by grinding media degradation was observed from such use of the resultant spheres, and very fine, regular and pure calcium carbide was obtained.

The multi-carbide spheres were also subjected to testing by use in standard industry processes. The spheres were used in a high-volume media mill and operated under nominal industrial production conditions used to mill titania. Titania is particularly sensitive to discoloration from contamination and was chosen to be a sensitive indicator to see if the microspheres were able to impart wear without themselves wearing significantly. Billions of particles of titania were processed to a final particle size of approximately $7 \times 10^{-8}$ meters without perceptible evidence of grinding media degradation.

While testing and processing various materials, impurities were occasionally measured to see how the process was working. Tests were conducted with calcium carbonate processed to less than 100 mm using standard media mill operating conditions and the grinding media of the invention of 120 microns diameter. The contamination level in the milled product was measured to be less than 100 ppm, and in some instances, less than 10 ppm. The contamination level is dependent on the substance being milled, with calcium carbonate being relatively soft. It is expected that the contamination level should always be below 300 ppm even when milling alumina.

While the present invention has been described with reference to a particular preferred embodiment, it will be understood by those skilled in the art that the invention is not limited to the preferred embodiment and that various modifications and the like could be made thereto without departing from the scope of the invention as defined in the following claims.

What is claimed is:

1. A method for producing Al2O3 particles of a size between $1 \times 10^{-9}$ meters and $1,000 \times 10^{-9}$ meters, comprising the steps of:
   (a) obtaining feed particles of Al2O3; and
   (b) processing said feed particles in a media mill using spheres comprising multi-carbide material with a mass density greater than 8 gm/cc and a hardness and toughness sufficient not to introduce contamination of the milled particles to a degree greater than about 600 ppm; said processing being at an energy intensity to cause size reduction of said feed particles for a period of time effective to reduce a size of said feed particles to between $1 \times 10^{-9}$ meters and $1,000 \times 10^{-9}$ meters.

2. A method according to claim 1, wherein said multi-carbide material includes carbide forming elements which are selected from the group consisting of chromium, hafnium, molybdenum, niobium, rhenium, tantalum, thallium, titanium, tungsten, vanadium, and zirconium.

3. A method according to claim 1, wherein said multi-carbide material further includes at least one carbide forming element in its elemental state.

4. A method for producing Al2O3 particles of a size between $1 \times 10^{-9}$ meters and $1,000 \times 10^{-9}$ meters, comprising the steps of:
   (a) obtaining feed particles of Al2O3; and
   (b) processing said feed particles in a media mill using spheres comprising multi-carbide material which comprise carbon and at least two different carbide-forming elements; said processing being at an energy intensity to cause size reduction of said feed particles for a period of time effective to reduce a size of said feed particles to between $1 \times 10^{-9}$ meters and $1,000 \times 10^{-9}$ meters.

5. A method according to claims 4, wherein said carbide forming elements are selected from the group consisting of chromium, hafnium, molybdenum, niobium, rhenium, tantalum, thallium, titanium, tungsten, vanadium, and zirconium.

6. A method according to claim 4, wherein said multi-carbide material further includes at least one carbide forming element in its elemental state.

7. A method according to claims 1 or 4, wherein said multi-carbide material comprises carbon and one carbide-forming element selected from the group consisting of chromium, hafnium, molybdenum, niobium, rhenium, tantalum, thallium, titanium, tungsten, vanadium, and zirconium, along with the elemental metal of the carbide-forming element.

8. A method according to claims 1 or 4, wherein said multi-carbide material consists essentially of titanium, tungsten, and carbon, in the ratios of from about 10 to 90 at % tungsten, from about 2 to 97 at % titanium, and the balance carbon.

9. A method according to claims 1 or 4, wherein said multi-carbide material consists essentially of about 10 to 40 at % carbon; from about 5 to 50 at % titanium, and the balance being tungsten.

10. A method according to claims 1 or 4, wherein said multi-carbide material comprises:
   a carbide consisting essentially of from about 10 to 40 at % carbon, from about 5 to 50 at % titanium, and the balance being tungsten; and
   at least one material taken from the group consisting of molybdenum, chromium, and rhenium;
   wherein said at least one material is in an amount from 0 to about 20 at %, with the tungsten remaining in the composition being not less than 10 at %.

11. A method according to claims 1 or 4, wherein said multi-carbide material comprises from about 20 to 30 at % carbon; from about 5 to 50 at % titanium; from about 0 to 30 at % of at least a first material from the group consisting of rhenium, zirconium, hafnium and molybdenum; from about 0 to 10 at % of at least a second material taken from the group consisting of vanadium, niobium and tantalum; from about 0 to 20 at % chromium; with the balance, but not less than 10 at %, being tungsten.

12. A method according to claims 1 or 4, wherein said multi-carbide material comprises:
   (a) from about 15 to 60 at % titanium and first alloying substituents, wherein said first alloying substituents consist of hafnium, niobium, tantalum and zirconium; and wherein titanium, titanium and niobium, or titanium and niobium and tantalum are present from 0 to 20 at %; wherein titanium or titanium and zirconium are present from about 0 to 10 at %; and wherein titanium or titanium and hafnium are present from about 0 to 30 at %; and the balance, if any, being titanium;
   (b) from about 3 to 47 at % tungsten and second alloying substituents, wherein said second alloying substituents consist of chromium, molybdenum, vanadium, tantalum and niobium; wherein tungsten or tungsten and chromium are present from about 0 to 5 at %; wherein tungsten or tungsten and molybdenum are present from about 0 to 25 at %; wherein tungsten or tungsten and vanadium are present from about 0 to 5 at %; and wherein tungsten, tungsten and tantalum, tungsten and niobium, or tungsten and tantalum and niobium are present from about 0 to 20 at %; and the balance, if any, being tungsten;
   (c) carbon from about 30 to 55 at %;
   (d) wherein the atomic percentages of niobium and tantalum, each alone or in combination, never exceed 20 at %; and
   (e) wherein the total at % of all constituents is 100 at %, all of the constituents of the alloy being of normal commercial purity.

13. A method for producing Al2O3 particles of a size between $1 \times 10^{-9}$ meters and $1,000 \times 10^{-9}$ meters, comprising the steps of:
   (a) obtaining feed particles of Al2O3; and
   (b) processing said feed particles in a media mill using spheres comprising multi-carbide material which comprise carbon and only one carbide-forming element selected from the group consisting of chromium, hafnium, molybdenum, niobium, rhenium, tantalum, thallium, titanium, tungsten, vanadium, and zirconium, along with the elemental metal of the carbide-forming element; said processing being at an energy intensity to cause size reduction of said feed particles for a period of time effective to reduce a size of said feed particles to between $1 \times 10^{-9}$ meters and $1,000 \times 10^{-9}$ meters.

14. A method according to claims 1, 4, or 13, wherein said media mill is one of a dry media mill and a wet media mill.

* * * * *

UNITED STATES PATENT AND TRADEMARK OFFICE
CERTIFICATE OF CORRECTION

| | | |
|---|---|---|
| PATENT NO. | : 7,267,292 B2 | Page 1 of 1 |
| APPLICATION NO. | : 11/035490 | |
| DATED | : September 11, 2007 | |
| INVENTOR(S) | : Robert J. Dobbs et al. | |

It is certified that error appears in the above-identified patent and that said Letters Patent is hereby corrected as shown below:

Column 18, line 7, the word "mm" should be --nm--.

Signed and Sealed this

Thirteenth Day of November, 2007

JON W. DUDAS
*Director of the United States Patent and Trademark Office*